United States Patent
Farhan et al.

(10) Patent No.: US 11,106,369 B1
(45) Date of Patent: Aug. 31, 2021

(54) HOST-ACCESSIBLE STORAGE DEVICE SERVICE LEVEL INDICATORS

(71) Applicant: Amazon Technologies, Inc., Seattle, WA (US)

(72) Inventors: Munif M. Farhan, Clyde Hill, WA (US); Douglas Stewart Laurence, Mercer Island, WA (US); Darin Lee Frink, Lake Tapps, WA (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1036 days.

(21) Appl. No.: 15/195,691

(22) Filed: Jun. 28, 2016

(51) Int. Cl.
*G06F 11/07* (2006.01)
*G06F 3/06* (2006.01)

(52) U.S. Cl.
CPC .......... *G06F 3/0616* (2013.01); *G06F 3/0629* (2013.01); *G06F 3/0653* (2013.01); *G06F 3/0683* (2013.01); *G06F 11/0727* (2013.01)

(58) Field of Classification Search
CPC ............... G06F 11/3034; G06F 3/0653; G06F 11/0727; G06F 11/08; G06F 11/16
See application file for complete search history.

(56) References Cited

U.S. PATENT DOCUMENTS

| | | | | |
|---|---|---|---|---|
| 8,261,122 B1* | 9/2012 | Kappel | ............... | G06F 11/1402 714/2 |
| 9,311,176 B1* | 4/2016 | Khokhar | ............... | G06F 11/008 |
| 2010/0106907 A1* | 4/2010 | Noguchi | ............. | G06F 11/2069 711/114 |
| 2014/0052706 A1* | 2/2014 | Misra | ................ | G06F 17/30194 707/698 |
| 2014/0189196 A1* | 7/2014 | Kelkar | .................... | G06F 12/16 711/102 |
| 2014/0297926 A1* | 10/2014 | Ono | ...................... | G06F 3/0688 711/103 |
| 2015/0039935 A1* | 2/2015 | Gao | ....................... | G06F 11/108 714/6.24 |
| 2016/0103630 A1* | 4/2016 | Shen | ..................... | G06F 3/0653 714/37 |
| 2016/0170841 A1* | 6/2016 | Yarnell | ............... | G06F 11/1076 714/19 |

* cited by examiner

*Primary Examiner* — Yolanda L Wilson
(74) *Attorney, Agent, or Firm* — Klarquist Sparkman, LLP

(57) ABSTRACT

Technologies are provided for retrieving service level indicators (SLIs) for storage devices, prioritizing data access using the SLIs, and scheduling storage device maintenance based on the SLIs. A host computer can retrieve an SLI for a storage device and determine, using the SLI, whether the storage device is performing service and maintenance operations and/or whether the storage device is in need of performing service and maintenance operations. The host computer can retrieve SLIs for multiple storage devices storing data redundantly and prioritize using the storage devices to access the data based on the SLIs. If the host computer determines that a storage device is in need of maintenance, based on its SLI, the host computer can schedule the storage device for maintenance and divert data access requests to other storage devices until the maintenance is complete.

23 Claims, 11 Drawing Sheets

HOST-ACCESSIBLE STORAGE DEVICE SERVICE LEVEL INDICATORS

BACKGROUND

Many modern storage devices, such as hard drives and solid state storage devices, are designed to perform service and maintenance operations to address issues that arise when data access operations are performed on the storage devices. Examples of such service and maintenance operations include data migration, garbage collection, and data track fixes. Many storage devices are designed to perform such service and maintenance operations in the background, without host computers connected to the storage devices being aware that they are being performed. Several such storage devices are designed to defer these service and maintenance operations until the storage devices are idle.

DETAILED DESCRIPTION

Figure 1:
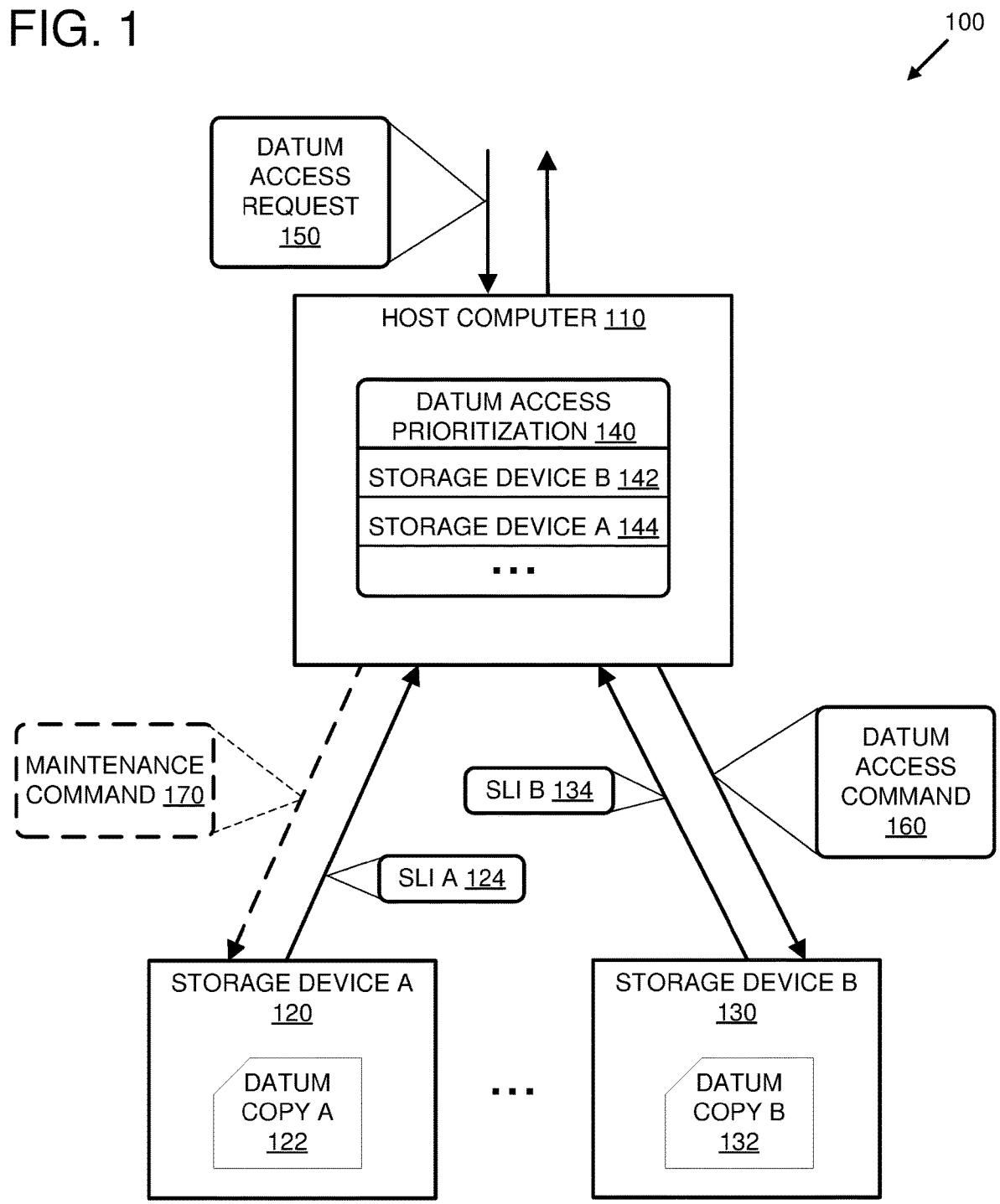
FIG. 1 is a system diagram showing an example system configured to prioritize data access requests based on service level indicators (SLIs) received from multiple storage devices.

Although some storage devices are designed to defer performing service and maintenance operations until they are idle, in some cases a storage device may not remain idle long enough to trigger the performance of the deferred service and maintenance operations. In such cases, the amount of issues caused by data access operations may continue to grow until the storage device reaches a point where the maintenance and service operations can no longer be deferred. At that point, the storage device will perform at least some of the maintenance and service operations, regardless of the number of pending data access operations. Once the storage device has begun to perform the maintenance and service operations, the data access performance of the storage device can be significantly reduced. Additionally or alternatively, the maintenance and service operations can impact a power consumption of the storage device. Since the host computer connected to the storage device is unaware that the maintenance and service operations are being performed, the host computer may be unable to anticipate and/or compensate for this reduction in data access performance. Furthermore, in at least some scenarios, the host computer may incorrectly mark the storage device as failed due to the drop in performance caused by the maintenance and service operations.

At least some of the embodiments of the technologies described herein solve these problems by enabling a host computer to retrieve service level indicators (SLIs) from one or more storage devices and prioritizing data access for the one or more storage devices using the SLIs. The host computer can use the SLIs to determine when a storage device is close to requiring mandatory service and maintenance and/or when the storage device is currently performing maintenance and service operations. Based on this determination, the host computer can use other storage devices, when possible, to perform data access operations until the service and maintenance operations on the storage device are complete.

Additionally, using least some of the embodiments of the technologies described herein, a host computer can monitor an SLI for a storage device and schedule the storage device for maintenance when the SLI is greater than or equal to a specified threshold. The host computer can divert data access requests to other storage devices while maintenance is performed on the storage device. The host computer can stop diverting data access requests after the maintenance is complete.

Additionally, using at least some of the embodiments of the technologies described herein, a host computer can determine that a response rate of a storage device is below a specified device failure threshold. The host computer can retrieve an SLI for the storage device and use the SLI to determine whether the storage device has encountered a failure condition or is performing background service and maintenance operations.

Additionally, using least some of the embodiments of the technologies described herein, a storage service can receive SLIs and metadata for multiple storage devices from multiple host computers. The storage service can prioritize access to the multiple storage devices based on the metadata and the SLIs. In some embodiments, the storage service can schedule storage devices for maintenance that have SLIs above a specified threshold.

FIG. 1 is a diagram showing an example system 100 configured to prioritize data access requests based on SLIs received from multiple storage devices.

A host computer 110 is connected to multiple storage devices (e.g., storage device A 120-storage device B 130). The host computer 110 is configured to receive SLIs (e.g., SLI A 124-SLI B 134) from the multiple storage devices 120-130 that indicate levels of need for service for the storage devices.

The host computer 110 is configured to use the received SLIs 124-134 to prioritize accessing the storage devices 120-130 for data stored redundantly on more than one of the storage devices 120-130. The host computer 110 can be configured to store the data redundantly on the storage devices 120-130. Copies of data can be stored on more than one of the storage devices 120-130. For example, a copy A 122 of a datum is stored in storage device A 120 and a copy B 132 of the datum is stored in storage device B 130. The host computer 110 can use the SLIs 124-134 to determine levels of need for service for the storage devices storing copies of the datum and prioritize the transmission of data access commands to storage devices with lower levels of need for service over the transmission of data access commands to storage devices with higher levels of need for service.

The host computer 110 is configured to create and maintain a datum access prioritization data structure 140 based, at least in part, on the SLIs 124-134. For example, based on SLI A 124 and SLI B 134, received from the storage device A 120 and the storage device B 134, respectively, the host computer 110 can assign a higher prioritization 142 to the storage device B 130 for accessing the datum than the prioritization 144 assigned to the storage device A 144. Although only two prioritizations (142 and 144) are illustrated in the prioritization data structure 140, more than two prioritizations are possible. In at least some embodiments, the host computer 110 is configured to create a prioritization in the prioritization data structure 140 for each of the multiple storage devices 120-130 storing a copy of the datum.

The host computer 110 is configured to receive a datum access request 150 and process the datum access request 150 by retrieving the datum from one of the storage devices 120-130. The host computer 110 uses the datum access prioritization data structure 140, at least in part, to determine which of the storage devices 120-130 to use to retrieve the datum. For example, given that the storage device B 130 has a higher prioritization 142 than the prioritization 144 for the storage device A 120, the host computer 110 can select the storage device B 130 and send a data access command 160 to the storage device B 130 instead of the storage device A 120.

Although FIG. 1 illustrates a single datum, the system 100 is also capable of prioritizing access to storage devices storing redundant copies of multiple data as well.

In at least some cases, prioritizing data access operations using storage device SLIs can increase the chances that background service operations performed on the storage devices will not impact data access performance. For example, by servicing data access requests, such as datum access request 150, using storage device B 130 instead of storage device A 120, chances can be increased that storage device A 120 will go idle and perform background service tasks. Once the background service tasks are complete, the storage device A 120 can update its associated SLI 124 to indicate that it now has no service tasks pending. The host computer 110 can receive the updated SLI 124 and update the prioritization 144 of storage device A 120 in the datum access prioritization data structure 140.

Optionally, instead of waiting for a storage device to enter an idle maintenance mode, the host computer 110 can place the storage device into a maintenance mode directly. For example, the host computer 110 can determine whether an SLI for one of the storage devices 120-130 is above a specified threshold. If the SLI is above the specified threshold, then the host computer 110 can transmit a maintenance command to the storage device. For example, FIG. 1 illustrates the host device 110 optionally transmitting a maintenance command 170 to the storage device A 120. The maintenance command 170 can be a command for the storage device to enter a maintenance mode, to perform any pending background service tasks, to perform one or more specific maintenance tasks, etc.

In any of the examples described herein, a storage device can be any device capable of storing data in one or more physical storage media. For example, the storage device can be a magnetic storage device, such as a hard disk drive. Other examples of storage devices include solid state storage devices (such as NAND-type flash devices and NOR-type flash devices), and random access data storage devices (such as DRAM devices).

In some embodiments, the storage device comprises a storage device controller configured to receive data access commands and perform read and write operations on the one or more physical storage media. In different or further embodiments, the storage device controller is configured to generate an SLI for the storage device. The storage device controller can generate the SLI by analyzing the one or more physical storage media and determining a level of need for service for the one or more physical storage media.

The storage device is configured to perform service operations on the one or more storage media within the storage device. Such operations may also be referred to as service tasks, maintenance operations, background maintenance, etc. The service operations can vary, depending on the type or types of the storage medium or media in the storage device.

One example service operation is correcting one or more cross-effects in a magnetic storage medium. In at least some a magnetic storage media, writing data to a track on a magnetic storage medium can create a cross-effect on one or more adjacent tracks. The storage device may be able to compensate for such cross-effects for a period of time, but eventually the storage device will need to fix the cross-effects by correcting the affected tracks.

Another example of a service operation is performing a batch of erase and/or relocation operations. In at least some solid state storage media, data cannot be directly overwritten. In such storage media, storage locations must first be cleared before new data can be stored. In order to speed up data update and delete operations, storage devices containing such storage media may defer clearing storage locations and perform clearing operations in a batch at a later point in time. In at least some cases, performing such a batch of service operations is referred to as garbage collection. Garbage collection can also comprise service operations to relocate data on the storage medium in order to consolidate and/or defragment the data. The term "garbage collection" can also refer to various other clean-up operations.

As another example, some storage devices comprise internal buffers that are used to cache data writes quickly. The buffered data writes are moved to permanent storage locations on storage media at a later point in time. However, if an internal buffer is full, or close to filling up, a storage device may have to stop accepting new write operations until the data in the buffer can be moved to a permanent storage medium.

The preceding service operation examples are provided for illustration and are not intended to be limiting. A storage device also may perform more than one type of service operation.

In at least some cases, a storage device can be configured to defer performing service operations in an attempt to keep the service operations from impacting the performance of data access operations. For example, the storage device may wait to perform service operations until the storage device is idle, or a rate of data access operations falls below a certain level. However, if the amount of deferred service work reaches a certain threshold, the storage device may perform all or part of the deferred service work, regardless of the impact on performance, in order to keep the storage device functioning properly.

The storage device is configured to generate a service level indicator (SLI) that indicates a level of the storage device's need for service.

In any of the examples described herein, an SLI can be generated by analyzing one or more storage media in a storage device to determine a level of need for service. For example, the SLI can be based on a number of scheduled service tasks for the one or more storage media that have not been performed. For example, the storage device can analyze a storage medium to ascertain an amount of garbage collection (such as re-organizing stored data, and/or completing deferred data clean-up) that needs to be performed on the storage medium. The SLI can be based on a combination of multiple different pending service operations. The SLI can be a numerical value, such as an integer or percentage, a sequence of characters, or a combination thereof. In some embodiments, the SLI can comprise more than one value.

The storage device may be configured, at a certain point, to stop servicing data access requests in order to perform mandatory maintenance tasks. In such cases, the SLI can be a value, such as a percentage, indicating how close the storage device is to entering such a mandatory maintenance mode.

In some embodiments, the SLI can indicate an estimated amount of time that it would take for the storage device to perform pending maintenance operations. For example, the SLI can comprise a number of time units (cycles, milliseconds, seconds, minutes, etc.) that it would take, approximately, for the storage device to perform pending service operations.

In at least some embodiments, the SLI can indicate that the storage device is currently performing background maintenance tasks. The SLI can indicate a mode of the storage device, such as a maintenance mode, a normal operation mode, etc.

In any of the examples described herein, a host computer can be a server or other computing device that comprises a processor and is connected to the storage device. The host computer is connected to the storage device and configured to transmit data access operations (such as data read and write operations) to the storage device and receive responses from the storage device. The connection can be a direct connection, such as a cable or bus connection, or an indirect connection, such as a connection over a network. In scenarios where the host computer is connected to more than one storage device, the various connections can be of the same type or different types.

In some embodiments, the host computer can comprise a storage controller connected to multiple storage devices. In at least some embodiments, the host computer can be a computing device configured to provide a unified access point for multiple connected storage devices, such as a JBOD ("just a bunch of drives/disks") device, a RAID array controller, etc.

The host computer is configured to receive SLIs from one or more connected storage devices. The host computer can be configured to store received SLIs, prioritize access to the one or more connected storage devices using the received SLIs, schedule storage device maintenance based on the SLIs, and/or transmit the SLIs to a storage service.

Figure 2:
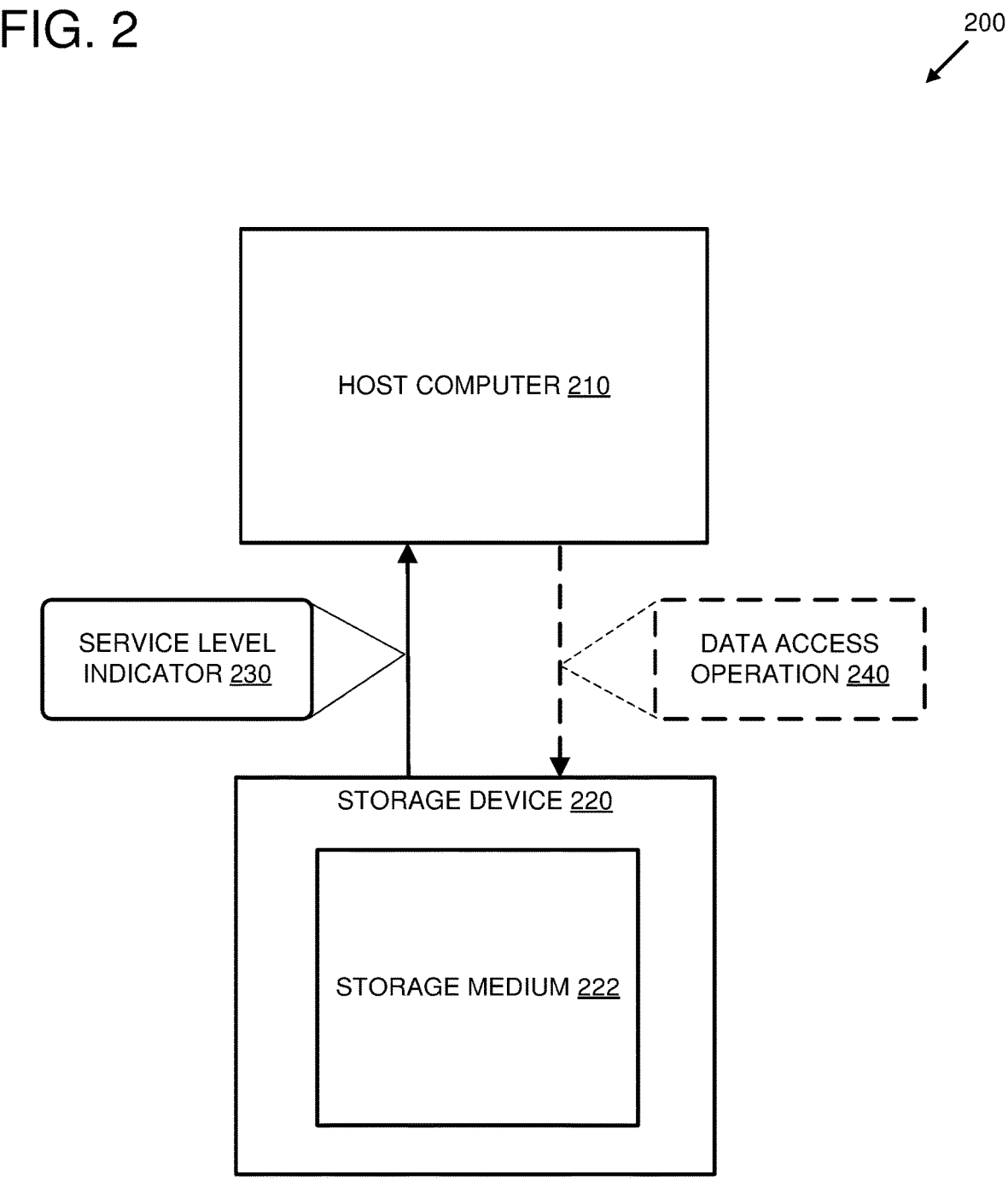
FIG. 2 is a system diagram showing an example system comprising a host computer configured to retrieve an SLI from a storage device.

FIG. 2 is a diagram showing an example system 200 comprising a host computer 210 configured to receive an SLI 230 from a storage device 220. The storage device 220 comprises a storage medium 222 and is configured to generate an SLI 230 that indicates how close the storage medium 222 is to requiring mandatory maintenance.

The host computer 210 is connected to the storage device 220 and is configured to receive the SLI 230 from the storage device 220.

In at least some embodiments, the storage device transmits the SLI 230 to the host computer at periodic intervals. In different or further embodiments, the storage device transmits SLI 230 to the host computer when a certain event(s) occur(s). Examples of such events include, a need for service exceeding a specified threshold, the value of the SLI 230 changing, the storage device entering or exiting a maintenance mode, etc.

In different or further embodiments, the host computer 210 can be configured to transmit a request for an SLI to the storage device 220. For example, the storage device 220 can expose an application programming interface (API) that includes a command to request an SLI from the storage device 220. The host computer can be configured to transmit such a command to the storage device 220 and receive the SLI 230 from the storage device 220 in response.

The host computer 210 is configured to determine whether to perform a data access operation 240 using the storage device based on the SLI 230. For example, the host computer may perform the data access operation 240 using the storage device 220 if the SLI 230 indicates that the storage medium 222 is not close to requiring mandatory maintenance. However, the host computer may refrain from performing the data access operation 240 using the storage medium 222 if the SLI 230 indicates that the storage device is close to requiring mandatory maintenance.

The storage medium 222 can be close to requiring mandatory maintenance if maintenance operations for the storage medium 222 have been deferred and the storage medium 222 will soon cease to function properly if the deferred maintenance operations are not performed. In at least some cases, the host computer 210 can refrain from performing the data access operation 240 using the storage device 220 in order to allow the storage device to perform deferred maintenance operations on the storage medium 222 without impacting the performance of the data access operation 240. In at least some scenarios, if the data access operation 240 is of a sufficient priority, the host computer 210 may perform the data access operation 240 even though the SLI 230 indicates that the storage medium 222 will soon require mandatory maintenance.

The determination of whether to perform the data access operation 240 using the storage device 210 can be based on whether the host computer 210 is able to perform the data access operation 240 using a different storage device (not shown) comprising another storage medium that is not as close to requiring mandatory maintenance as the storage medium 222 in the storage device 220.

Figure 3:
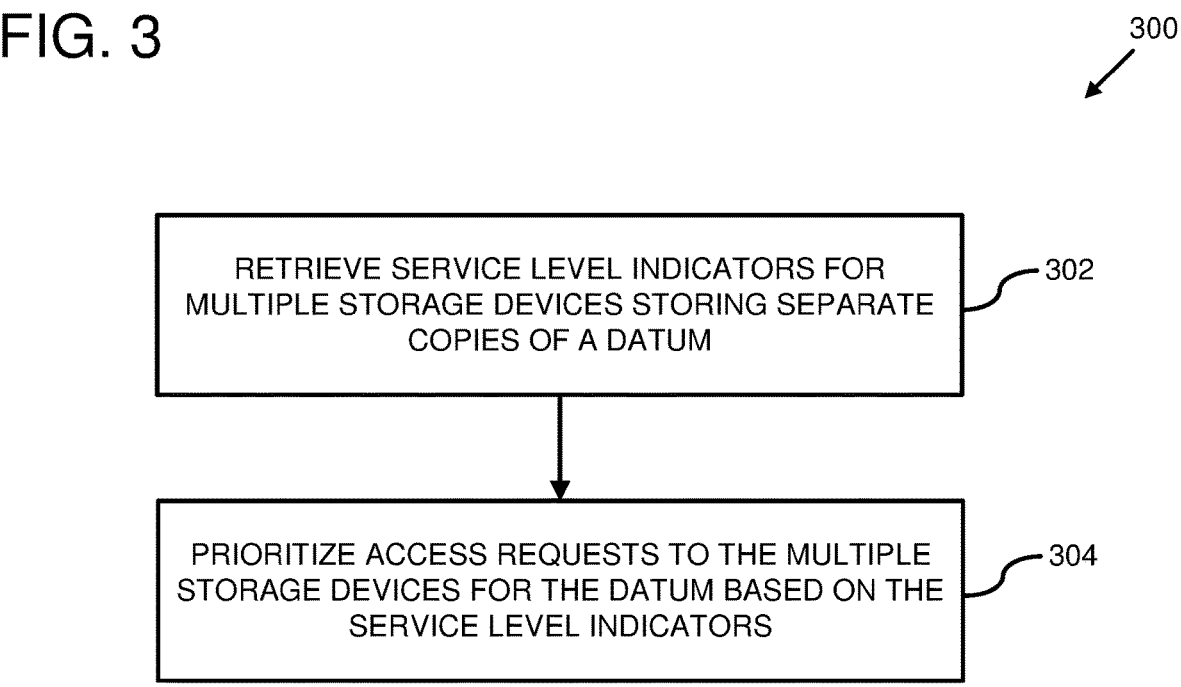
FIG. 3 is a flowchart of an example method for retrieving SLIs for multiple storage devices and prioritizing access requests based on the SLIs.

FIG. 3 is a flowchart of an example method 300 for retrieving SLIs for multiple storage devices and prioritizing access requests to the multiple storage devices based on the retrieved SLIs. Any of the example systems described herein can be used to perform the example method 300.

At 302, SLIs are retrieved for multiple storage devices storing separate copies of a datum. The SLIs can be retrieved by sending requests for the SLIs to the multiple storage devices. In at least some embodiments, the SLIs can indicate levels of need for service for the multiple storage devices. In embodiments where the storage devices each comprise one or more storage media, the SLIs can indicate how close the storage media are to requiring mandatory maintenance.

In at least some embodiments, requests for the SLIs are sent to the multiple storage devices. For example, the requests for the SLIs can be sent to the multiple storage devices after a request for the datum is received. Additionally or alternatively, the requests for the SLIs can be sent at certain points in time and the received SLIs can be saved in a memory and/or storage.

In different or further embodiments, the multiple storage devices can send the SLIs at certain points in time. For example the multiple storage devices can send the SLIs periodically, and/or in response to the occurrence of certain events, etc. For example, a storage device can send an SLI after a certain amount of time has elapsed since the storage device last sent an SLI.

In at least some embodiments, the multiple storage devices can send updated SLIs whenever changes in the SLIs occur. For example, a storage device can track its SLI internally and send the SLI when the SLI changes, such as when an amount of pending service for the storage device increases due to data access activity and/or decreases due to the performance of some or all of the pending service.

In at least some embodiments where the multiple storage devices can send the SLIs at certain periods in time, one or more host computers connected to the multiple storage devices can receive the SLIs and store them in association with the multiple storage devices. In such embodiments, the SLIs can be retrieved from the one or more host computers.

At 304, access requests to the multiple storage devices for the datum are prioritized based on the SLIs. In at least some embodiments, a prioritization data structure is created and maintained that ranks the multiple storage devices based on their respective SLIs. For example, storage devices with SLIs that indicate they have a low level of need for service can be ranked higher, while storage devices with SLIs that indicate they have higher levels of need for service can be ranked lower. In such an embodiment, an example prioritization can comprise selecting a storage device with a highest ranking to process a received access request for the datum. As new SLIs are retrieved for the multiple storage devices, the ranking of the multiple storage devices can be updated.

In a further embodiment, the same or a different data structure can be used to track which of the multiple storage devices are currently processing access requests. In such an embodiment, an example prioritization can comprise selecting a storage device to process a received access request for the datum that is not currently processing an access request and that has a highest ranking with respect to other storage devices that are not currently processing access requests. In a different or further embodiment, data access rates (such as inputs and/or outputs per second, or TOPS) for the storage devices can be used instead of, or in addition to, tracking which storage devices are currently processing access requests when prioritizing access requests for the datum based on the SLIs.

In at least some embodiments, the SLIs can be used to categorize the multiple storage devices. For example, storage devices with SLIs below a certain level can be categorized as not in need of service, while storage devices with SLIs above that level (or above a different level) can be categorized as in need of service. In such an embodiment, the prioritizing can comprise using the storage devices categorized as not being in need of service to process access requests for the datum and not using the storage devices categorized as being in need of service to process the access requests. Alternatively or additionally, the prioritizing can comprise using the storage devices categorized as in need of service to process access requests when it is not possible to process all of the access requests using the storage devices categorized as not in need of service and still maintain minimum specified performance levels. As new SLIs for the multiple storage devices are retrieved, one or more of the storage devices may be re-categorized. For example, processing access requests may have increased an SLI for a given storage device such that it is re-categorized as in need of service. Conversely, not being used to process access requests (or being used to process fewer access requests) may have given another storage device an opportunity to perform service operations, thereby reducing its SLI such that it is re-categorized as not in need of service.

Figure 4:
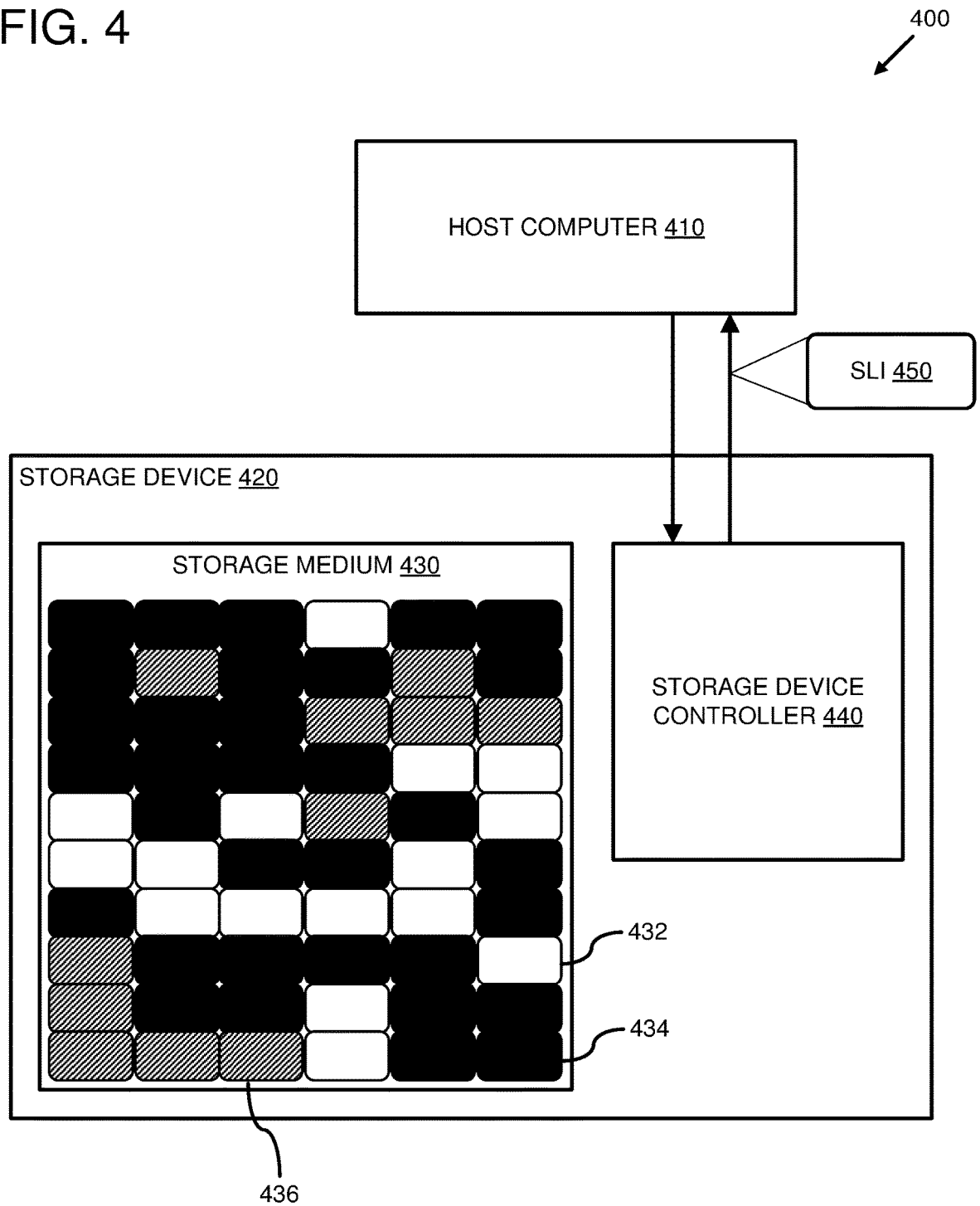
FIG. 4 is a system diagram showing an example system comprising a storage device configured to generate an SLI based on a state of a storage medium of the storage device.

FIG. 4 is a diagram showing an example system 400 comprising a storage device 420 configured to generate an SLI 450 based on a state of a storage medium 430.

The storage device 420 comprises a storage medium 430 and a storage device controller 440. The storage device 420 is connected to a host computer 410. The storage device controller 440 is configured to receive a request from the host computer 410 for the SLI 450, to generate the SLI 450 based on a state of the storage medium 430, and to transmit the SLI 450 to the host computer 410.

The storage medium 430 comprises multiple physical storage locations (e.g., 432, 434, and 436) in which data can be stored. In FIG. 4, the multiple physical storage locations in the storage medium 430 are represented as a two-dimensional grid of rectangular elements. However, this is for illustration and is not intended to necessarily be an accurate representation of the physical layout of the storage medium 430. The actual physical arrangement of the storage locations within the storage medium 430 can vary based on the type of the storage medium 430 (magnetic disk, solid state storage, DRAM storage, etc.). The number of storage locations represented FIG. 4 is not intended to be limiting. More or fewer physical storage locations are possible.

The solid white storage locations (e.g., 432) represent physical storage locations in the storage medium 430 that do not contain data (a.k.a., "free locations"). The solid gray storage locations (e.g., 434) represent physical storage locations that contain data (a.k.a., "full locations"). The gray and white striped storage locations (e.g., 436) represent physical storage locations that are in need of maintenance (a.k.a., "service locations"). The service locations may or may not contain data. For example, a service location can be a storage location that contains data that has been unintentionally affected by a write operation, such as a cross-effect created by a write operation to one or more nearby storage locations. In such a scenario, the data stored in the service location may need to be re-written to fix the cross-effect. Alternatively or additionally, a service location can contain data that has been marked as deleted but that needs to be cleared before new data can be written to the service location. Alternatively or additionally, a service location can contain store data as a temporary buffer, in which case, at some point, the data stored in the storage location may need to be moved to a different storage location at some point. Alternatively or additionally, service locations can contain data that have been identified as candidates for a defragmentation operation. These examples are provided for illustration and are not intended to be limiting. Other types of service locations are also possible, and may vary based on the type of the storage medium 430.

In some embodiments, the storage device controller 440 analyzes the storage medium 430 to identify the number and arrangement of the free locations, full locations, and service locations within the storage medium 430. In different or further embodiments, the storage device controller 440 keeps a record of the number and arrangement of the free locations, full locations, and service locations, and updates the record as data access operations are performed on the storage medium 430. The storage device controller 440 can be configured to generate the SLI 450 based on the number and arrangement of the free locations, full locations, and service locations, and to update the record as data access operations are performed on the storage medium 430.

In at least some embodiments, the SLI 450 can indicate how close the storage medium 430 is to requiring mandatory maintenance. For example, the storage device controller 440 can be configured to automatically perform maintenance operations on the storage medium 430 when the number, arrangement, and/or type of the service locations triggers a specified threshold condition. Such a threshold condition can represent, for example, a point at which the number, arrangement, and/or type of the service locations begins to impact the performance of the storage device 420.

Although the storage device 420 is illustrated as comprising a single storage medium 430, it is also possible for the storage device 420 to comprise more than one storage medium. In such an embodiment, the storage device controller 440 can be configured to generate the SLI 450 based on states of the more than one storage medium. Alternatively or additionally, the storage device controller 440 can be configured to generate more than one SLI corresponding to the more than one storage medium. In such an embodiment, the storage device controller 440 can be configured to send the more than one SLI to the host computer 410. Alternatively or additionally, the host computer 410 can be configured to request an individual SLI, of the more than one SLIs, corresponding to a particular storage medium, of the more than one storage media.

Figure 5:
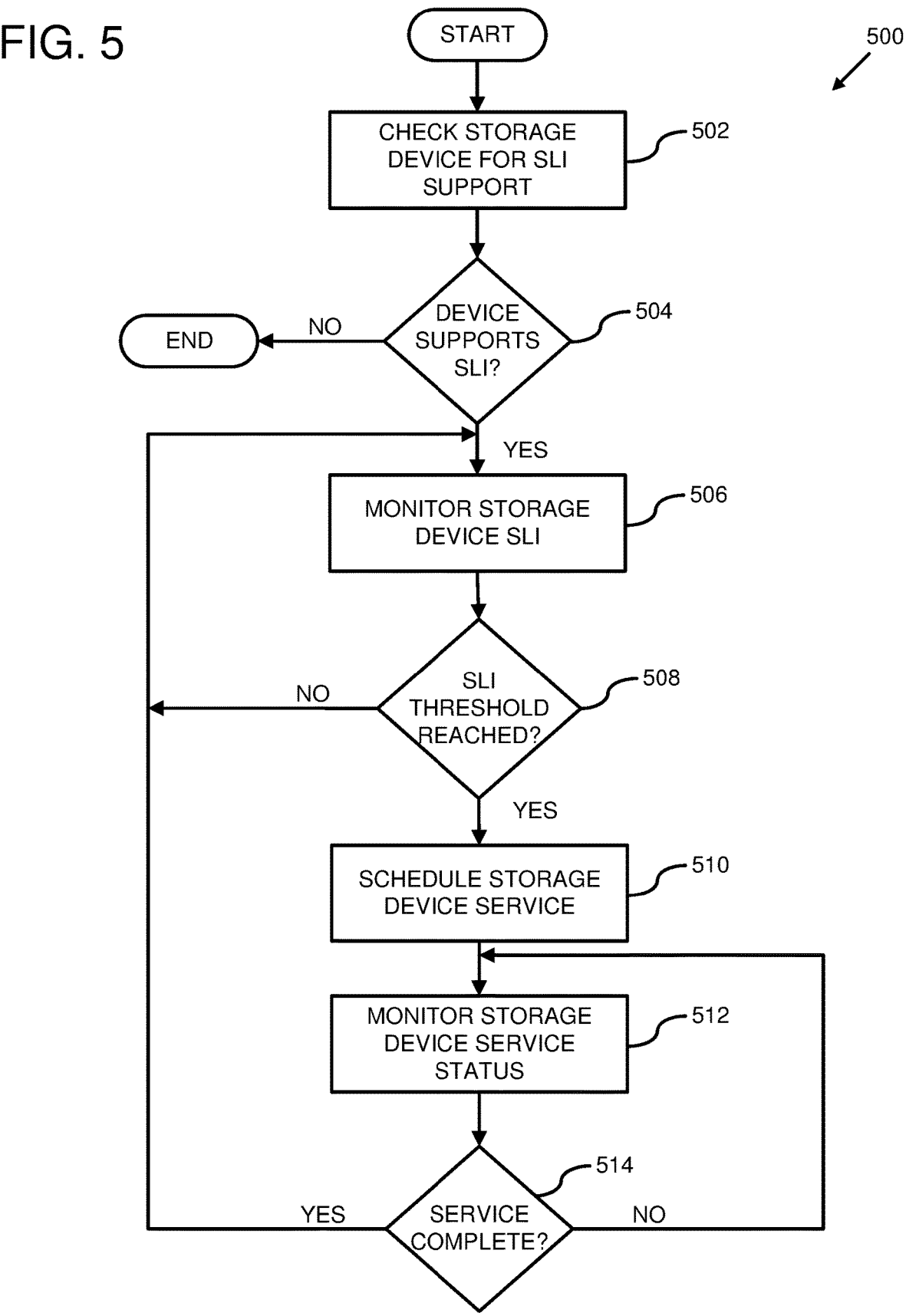
FIG. 5 is a flowchart of an example method for monitoring a storage device SLI and scheduling storage device service when the SLI reaches an SLI threshold.

FIG. 5 is a flowchart of an example method 500 for monitoring an SLI of a storage device and scheduling service for the storage device when the SLI reaches a specified threshold. Any of the example systems described herein can be used to perform the example method 500.

At 502, the storage device is checked to determine whether or not it has SLI support. This can be determined, for example, by inspecting a firmware of the storage device to see if the SLI feature is a feature supported by the storage device. Alternatively or additionally, a command, such as an API call, can be sent to the storage device, requesting an SLI. If the storage device returns an SLI, then it can be concluded that the storage device supports the SLI feature. However, if the storage device returns an error code and/or error message, it can be concluded that the storage device does not support the SLI feature. At 504, if the storage device does not support the SLI feature, then the example method 500 terminates. However, if the storage device does support the SLI feature, then the example method 500 continues to 506.

At 506, the SLI for the storage device is monitored. The storage device can generate and transmit SLIs at periodic intervals. Alternatively, or additionally, a request for an SLI can be transmitted to the storage device and the storage device can transmit the SLI back in response. The SLI is compared to an SLI threshold. In at least some embodiments, the SLI can be a numerical value or a percentage. In such embodiments, the SLI threshold can also be a numerical value or percentage that, when the SLI is greater than or equal to the SLI threshold, indicates that the storage device is in need of service. In at least some embodiments, the SLI can be a code or sequence of characters. For example, various codes or sequences of characters can be predefined that indicate various levels of need for service (e.g., low, medium, high, critical, etc.). In such embodiments, the SLI threshold can comprise one or more of the predefined codes or sequences. When the SLI comprises at least one of the one or more predefined codes or sequences in the SLI threshold, it can be determined that the storage device is in need of service.

At 508, it is determined whether the SLI threshold has been reached. If the SLI threshold has not been reached, then the monitoring of the storage device SLI continues at 506. If the SLI threshold has been reached, then the storage device is scheduled for service at 510. Scheduling the storage device for service can comprise transmitting a command to the storage device for the storage device to perform service operations and/or enter a service mode. In at least some embodiments, data stored on the storage device is also stored on other storage devices. In such embodiments, scheduling the storage device for service can comprise prioritizing the use of the other storage devices for accessing the data over the use of the storage device for accessing the data. Such a de-prioritization of the service device can free up enough of the storage device's bandwidth to allow the storage device to perform service operations without impacting the storage device's data access performance. In different or further embodiments, the storage device is switched to an offline mode as part of the scheduling, wherein the storage device is unable to receive data access requests until the storage device is switched back to an online mode.

In at least one embodiment, scheduling the storage device for service comprises prioritizing the performance of service operations on the storage device with respect to other storage devices that are also scheduled for service. For example, more storage devices may be scheduled for service than are allowed to simultaneously perform service operations and/or be switched to a service mode. In such cases, SLIs of the storage devices can be used to determine which of the storage devices scheduled for service have the greatest need for service.

For example, the SLIs can be used to rank the storage devices scheduled for service. A specified number of the storage devices can be selected based on the ranking. The selected storage devices can be designated to perform service operations and/or be switched to a service mode. While service operations are being performed on the designated storage devices, the remaining storage devices that are scheduled for service can be used to perform data access operations. Once service is complete on one of the designated storage devices, another of the scheduled storage devices can be selected based on the ranking and can be designated to perform service operations and/or be switched to a service mode. This can continue until service operations have been performed on all storage devices scheduled for maintenance.

In at least some embodiments, the specified number of storage devices that can simultaneously perform service operations and/or be switched to a service mode can be based on one or more data redundancy criteria. For example, in embodiments where data is stored redundantly on multiple storage devices, a redundancy threshold can be specified that represents a minimum number of storage devices storing the data that must remain available to perform data access operations for the data. In such an embodiment, a storage device scheduled for service may not be designated to perform service operations and/or switched to a service mode if doing so would cause a number of available storage devices to drop below the redundancy threshold.

In a different or further embodiment where multiple shards of data objects are stored on the multiple storage devices, the one or more redundancy criteria can comprise a minimum shard count that represents a number of storage devices storing shards of a data object that must be available in order to reconstruct the data object. In such an embodiment, a storage device scheduled for service may not be designated to perform service operations and/or switched to a service mode if doing so would cause a number of available storage devices storing shards of the data object to drop below the minimum shard count.

At 512, a service status of the storage device is monitored. The service status can be an SLI for the storage device or a different indicator that is monitored after the storage device has been scheduled for service at 510. The service status can indicate a mode of the storage device, such as a normal operation mode, a service mode, etc. The service status can comprise a numerical value, percentage, and/or sequence of characters that indicates a progress of service performed on the storage device. Updates to the service status can be transmitted by the service device at periodic intervals while service operations are being performed. Alternatively or additionally, a request for the service status can be transmitted to the storage device and the storage device can transmit the service status in response. The storage device may update the service status internally as service progresses and/or determine the service status when a request for the service status is received.

In at least some embodiments where the storage device is placed into a maintenance mode, instead of, or in addition to, monitoring the service status of the storage device, a diagnostic code can be retrieved from the storage device. It can be determined, using the diagnostic code, that one or more particular service tasks can be performed on the storage device. In at least some embodiments, the diagnostic code can indicate that the storage device has experienced one or more failures. For example, the diagnostic code may indicate that a mechanical failure (such as a read and/or write head failure, etc.) has occurred. Other types of failures (such as a failure of a portion of a storage medium, a failure of an electronic component of the storage device, etc.) can be detected using diagnostic codes as well. In at least some cases, based on the type of failure that has occurred, particular service tasks can be performed to repair and/or mitigate the failure. For example, in the case of a failed read and/or write head, in at least some embodiments, one or more storage media of the storage device can be reformatted to allow the storage device to continue to operate without the use of the failed head. Such repair and/or mitigation tasks can be performed while the storage device is scheduled for service and/or while the storage device is in a service mode.

At 514 it is determined, using the service status, whether service on the storage device is complete. In embodiments where the service status is the SLI of the storage device, it can be determined that the service is complete, for example, when the SLI is less than a specified threshold. The specified threshold can be the SLI threshold that was used at 508 or a different threshold. In at least some embodiments, the specified threshold can be set to a smallest/lowest possible value for the SLI to indicate that service is complete when there is no need, or a minimal need, for service operations to be performed on the storage device.

In embodiments where the service status indicates a mode of the storage device, the value of the service status can be used to detect when the mode of the storage device changes from a normal operating mode to a service mode. When the service status changes from indicating the normal operating mode to indicating the service mode, it can be determined that service on the storage device has begun. When the service status subsequently changes from indicating the service mode back to indicating the normal operating mode, it can be determined that the service on the storage device has competed. In embodiments where the service status comprises a numerical value, percentage, and/or sequence of characters that indicates a progress of service performed on the storage device, it can be determined that the service is complete when the numerical value, percentage, and/or sequence of characters indicates that the service is complete.

If it is determined that the service on the storage device is not complete, then the monitoring of the service status continues at 512. If it is determined that the service on the storage device is complete, then the example method 500 returns to the monitoring of the storage device SLI at 506. In embodiments where a command was transmitted to the storage device to enter a service mode, when the service is complete, a command can be transmitted to the storage device to exit the service mode. In embodiments where the storage device was switched to an offline mode as part of scheduling the storage device for service at 510, when the service is complete, the storage device can be switched back to an online mode, wherein the storage device is able to receive data access requests.

Although a single storage device is described in example method 500, the method can readily be extended to monitor SLIs received from multiple storage devices, to identify more than one storage device, of the multiple storage devices, in need of maintenance, and to schedule the more than one identified storage devices for maintenance.

Figure 6:
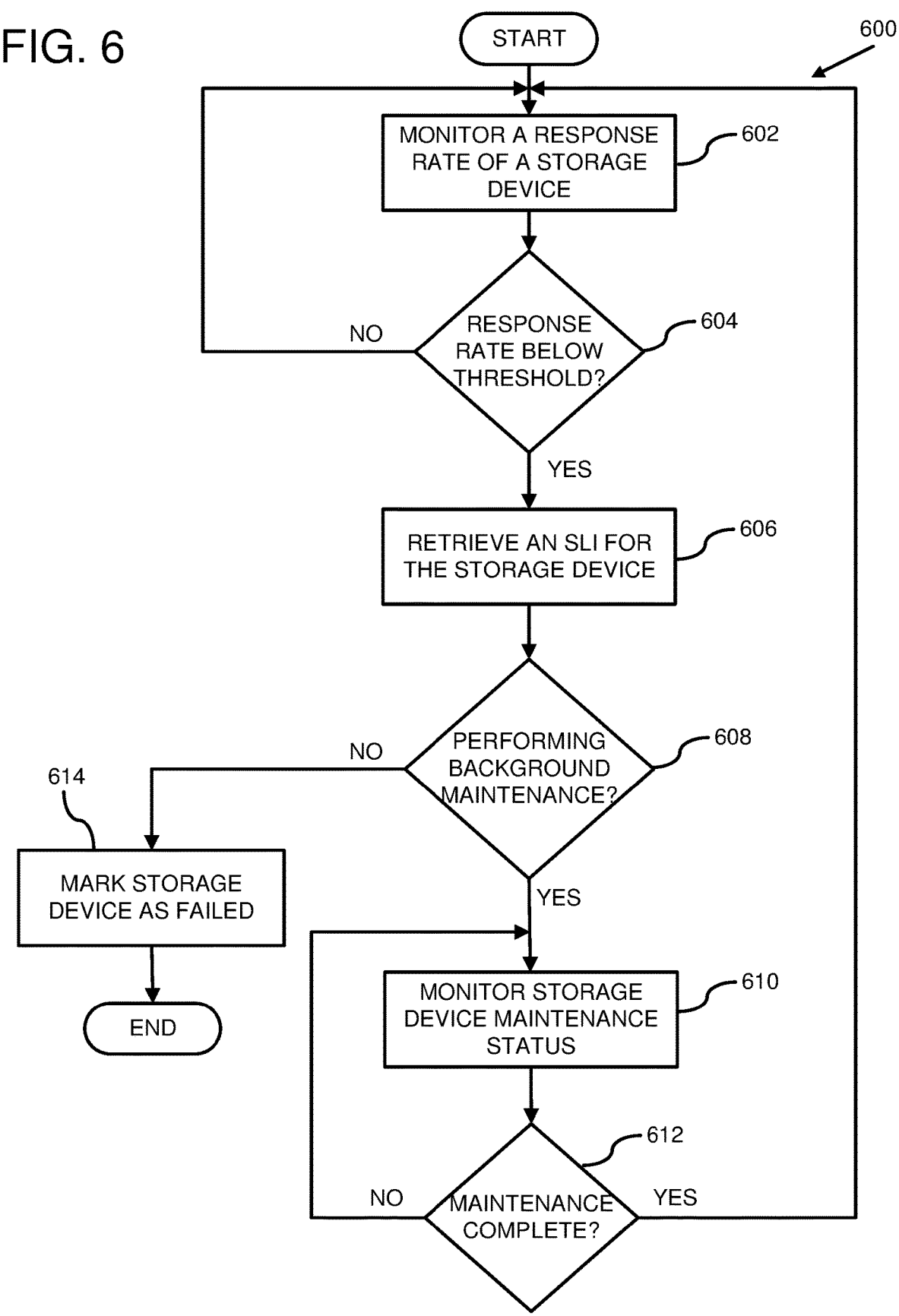
FIG. 6 is a flowchart of an example method for using an SLI to determine whether a storage device has failed or is performing background maintenance.

FIG. 6 is a flowchart of an example method 600 for using an SLI received from a storage device to determine whether the storage device has failed or is performing background maintenance. Any of the example systems described herein can be used to perform the example method 600.

At 602, a response rate of a storage device is monitored. The response rate can indicate a level of performance of the storage device. The response rate can be represented as a ratio, such as a number of inputs and/or outputs per unit of time (e.g., IOPS), an average amount of time the storage device takes to respond to one or more data access requests, an average amount of data received from the storage device over a given period of time, etc. The response rate can be received from the storage device. Alternatively or additionally, the response rate can be calculated based on data received from the storage device.

At 604, it is determined whether the response rate is below a specified threshold. The specified threshold can indicate a minimum acceptable level of performance for the storage device. Alternatively or additionally, the specified threshold can indicate a failure threshold for the storage device. In such a scenario, a response rate below the specified threshold may indicate that the storage device has encountered a failure condition. For example, performance below the specified threshold may indicate that one or more physical components of the storage device are malfunctioning.

If the response rate is not below the specified threshold, then the response rate of the storage device continues to be monitored at 602. If the response rate for the storage device is below the specified threshold, then at 606 an SLI for the storage device is retrieved. In at least some embodiments, the storage device routinely transmits an SLI to a connected host computer. In such an embodiment, the host computer can store one or more of the received SLI and, at 606, one or more of the SLIs stored at the host computer can be retrieved. In different or further embodiments, the SLI can be retrieved by transmitting a request for the SLI to the storage device.

At 608, it is determined, using the SLI, whether the storage device is performing background maintenance. In at least some embodiments, the SLI can indicate a mode of the storage device, such as a normal operation mode or a maintenance mode. In such an embodiment, it can determined that the storage device is performing background maintenance if the SLI indicates that the storage device is in a maintenance mode. In different or further embodiments, the SLI can indicate a level of need for maintenance for the storage device. In such an embodiment, if the SLI indicates a level of need for maintenance that is greater than or equal to a level at which the storage device would automatically perform background maintenance, then it can be determined that the storage device is performing background maintenance. Alternatively or additionally, multiple SLIs for the storage device can be retrieved over a period of time. If the SLIs, in combination, indicate that the storage device's level of need for maintenance is decreasing, then it can be determined that the storage device is performing background maintenance. In different or further embodiments, the SLI can indicate a level of progress of maintenance being performed on the storage device. In such an embodiment, it can be determined that the storage device is performing background maintenance if the SLI indicates at least some level of maintenance progress.

If it is determined at 608 that the storage device is not performing background maintenance, then at 614, the storage device is marked as failed. Marking the storage device as failed can comprise indicating that the storage device is no longer available for data access operations. Alternatively, or additionally, marking the storage device as failed can comprise switching the storage device to an offline mode and/or adding the storage device to a list of storage devices to be inspected and/or replaced.

If it is determined at 608 that the storage device is performing background maintenance, then at 610 a maintenance status of the storage device is monitored. The maintenance status can be an SLI for the storage device or a different indicator that is monitored after it is determined that the storage device is performing background maintenance. The maintenance status can indicate a mode of the storage device, such as a normal operation mode or a maintenance mode. The maintenance status can comprise a numerical value, percentage, and/or sequence of characters that indicates a progress of background maintenance performed on the storage device. Updates to the maintenance status can be transmitted by the storage device at periodic intervals, or in response to certain events (such as a change in the amount of progress), while the background maintenance is being performed. Alternatively or additionally, a request for the maintenance status can be transmitted to the storage device and the storage device can transmit the maintenance status in response. The storage device may update the maintenance status internally as background maintenance progresses and/or determine the maintenance status when a request for the maintenance status is received.

While the storage device is performing background maintenance, access requests for data stored on the storage device can be deprioritized.

At 612 it is determined, using the maintenance status, whether the background maintenance on the storage device is complete. In embodiments where the maintenance status is an SLI of the storage device, it can be determined that the background maintenance is complete when the SLI is less than a specified SLI threshold. In at least some embodiments, the specified SLI threshold can be set to a smallest/lowest possible value for the SLI to indicate that background maintenance is complete when there is no need, or a minimal need, for maintenance to be performed on the storage device.

In embodiments where the maintenance status indicates a mode of the storage device, the value of the maintenance status can be used to detect when the mode of the storage device changes from a normal operating mode to a maintenance mode. When the maintenance status changes from indicating the normal operating mode to indicating the maintenance mode, it can be determined that background maintenance on the storage device has begun. When the maintenance status subsequently changes from indicating the maintenance mode back to indicating the normal operating mode, it can be determined that the background maintenance on the storage device is compete. In embodiments where the maintenance status comprises a numerical value, percentage, and/or sequence of characters that indicates a progress of background maintenance performed on the storage device, it can be determined that the background maintenance is complete when the numerical value, percentage, and/or sequence of characters indicates that the background maintenance is complete.

If it is determined that the background maintenance on the storage device is not complete, then the monitoring of the maintenance status continues at 610. If it is determined that the background maintenance on the storage device is complete, then the example method 600 returns to the monitoring of the response rate of the storage device at 602.

Although a single storage device is described in example method 600, the method can readily be extended to monitor response rates for multiple storage devices, to retrieve SLIs for more than one of the multiple storage devices, and to determine whether the one or more of the multiple storage devices are performing background maintenance.

Figure 7:
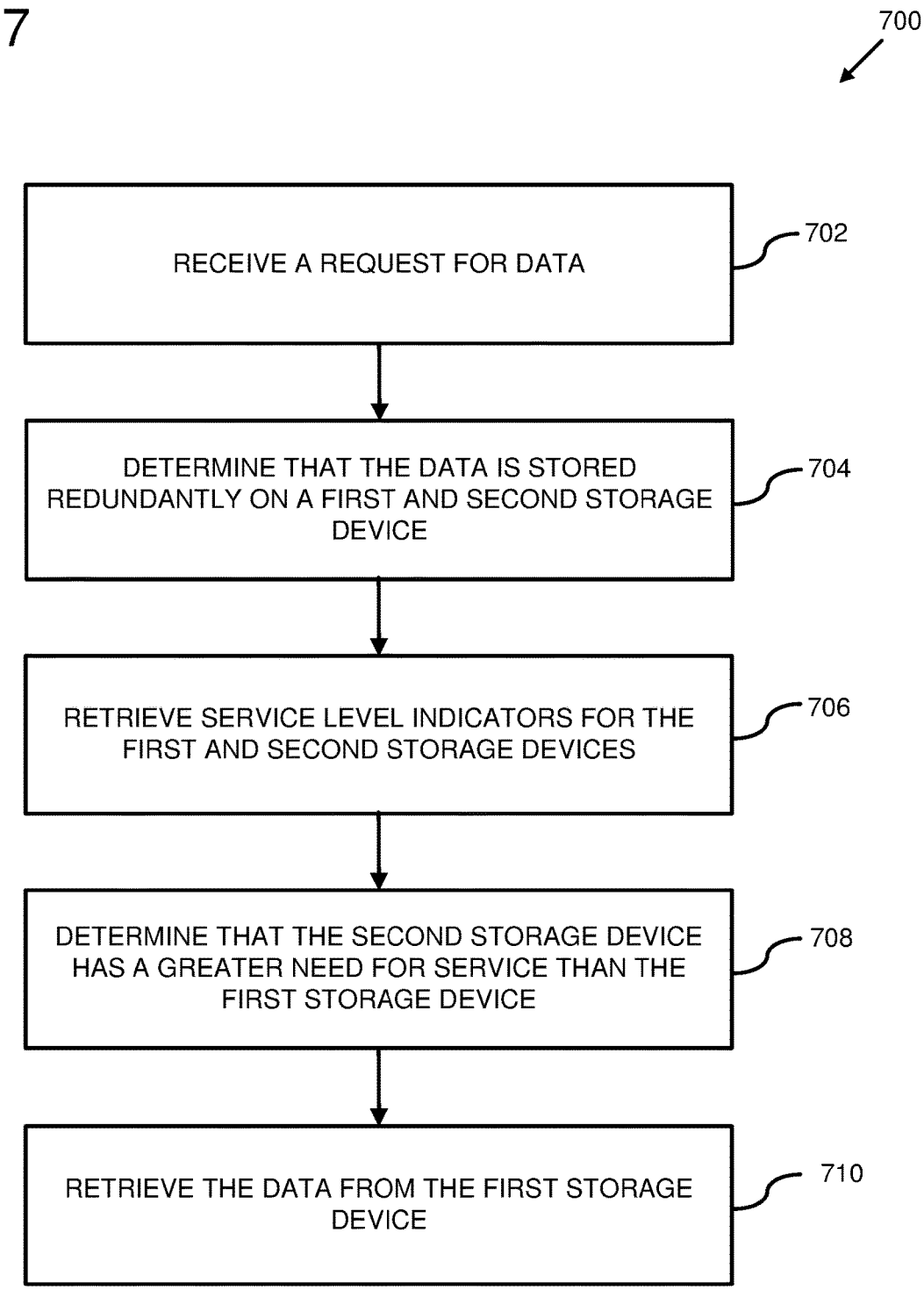
FIG. 7 is a flowchart of an example method for retrieving data from one of two storage devices storing data redundantly using SLIs retrieved from the storage devices.

FIG. 7 is a flowchart of an example method 700 for retrieving data from one of two storage devices storing data redundantly. A determination is made, using SLIs retrieved from the storage devices, as to which of the two storage devices should be used for the data retrieval. Any of the example systems described herein can be used to perform example method 700.

At 702, a request is received for data. The request can be received, in at least one embodiment, at a host computer connected to the two storage devices. In different or further embodiment, the two storage devices can be connected to separate host computers and the request can be received at a storage service running on a separate server computer connected to the separate host computers. In a different or further embodiment, the request can be generated by an application running on one of the host computers or a different computer connected to the host computers and/or the storage service.

At 704, it is determined that the requested data is stored redundantly on the first and second storage devices. For example, it can be determined that a copy of the data is stored on the first storage device and another copy of the data is stored on the second storage device. The determination that the data is stored redundantly on both storage devices can be made by inspecting a data structure that identifies which storage devices store copies of the requested data. For example, the requested data can be associated with an identifier that uniquely identifies the data. Such an identifier can be used to look up a record associated with the identifier that comprises a list of one or more storage device identifiers that identify storage devices storing copies of the data. In such an embodiment, a record associated with the requested data's identifier can comprise identifiers for the first and second storage devices. Alternatively or additionally, the determination can comprise querying the storage devices using the identifier for the data and receiving responses from the first and second storage devices indicating that the first and second storage devices store copies of the requested data.

At 706, SLIs for the first and second storage devices are retrieved. The SLIs can be retrieved by transmitting a request for an SLI to each of the storage devices and receiving the SLIs in response. Alternatively or additionally, the storage devices can transmit SLIs at certain points in time. In such a scenario, the transmitted SLIs can be stored in a separate location and retrieved from that location. In an embodiment where the first and second storage devices are connected to the same host computer, the host computer can store the SLIs received from the storage devices (e.g., in a memory or separate storage of the host computer). In an embodiment where the first and second storage devices are connected to separate host computers, the separate host computers can store the SLIs separately. Additionally or alternatively, the separate host computers can transmit the SLIs to a storage service that can store the SLIs and retrieve them at 706 after it is determined at 704 that the requested data is stored redundantly on the first and second storage devices.

At 708, it is determined, using the SLIs for the first and second storage devices, that the second storage device has a greater need for service than the first storage device. In at least one embodiment, the SLIs can indicate levels of need for service operations to be performed on the respective storage devices. In such an embodiment, it can be determined, using the SLIs, that the second storage device has a higher level of need for service than the first storage device. In a different or further embodiment, the SLIs can indicate how close the first and second storage devices are to requiring mandatory maintenance. In such an embodiment, it can be determined, using the SLIs, that the second storage device has a greater need for service if its SLI indicates that it is closer to requiring mandatory maintenance than the first storage device.

At 710, the requested data is retrieved from the first storage device since the first storage device has a lesser need for service than the second storage device. In at least some embodiments, the SLI of the second storage device can be evaluated to determine whether the SLI of the second storage device is above a specified threshold. The specified threshold can be, for example, selected from a range of available thresholds based on one or more quality of service requirements for the data stored redundantly on the first and second storage devices.

If the SLI for the second storage device is above the specified threshold, service tasks can be performed on the second storage device. While the service tasks are performed on the second storage device, data access requests for data stored on both the first and second storage devices can be fulfilled using the first storage device.

In at least some embodiments, the second storage device can be switched to an offline mode before the service tasks are performed. In such an embodiment, the second storage device can be switched back to an online mode after the performing of the service tasks. In an embodiment where the first and second storage devices are connected to different host computers, the host computer connected to the second storage device can be switched to an offline mode, wherein the host computer is unable to receive requests for data, before performing the service tasks and switched back to an online mode, wherein the host computer is able to receive requests for data, after the service tasks are complete.

Although example method 700 is described in terms of two storage devices, it can readily be extended to more than two storage devices. For example, it can be determined at 704 that the data is stored redundantly on more than two storage devices. At 706, SLIs can be retrieved for the more than two storage devices, at 708 it can be determined that one of the storage devices has a lowest or lower need for service with respect to the other storage devices, and at 710 the data can be retrieved from the storage device with the lower or lowest need for service with respect to the other storage devices.

Figure 8:
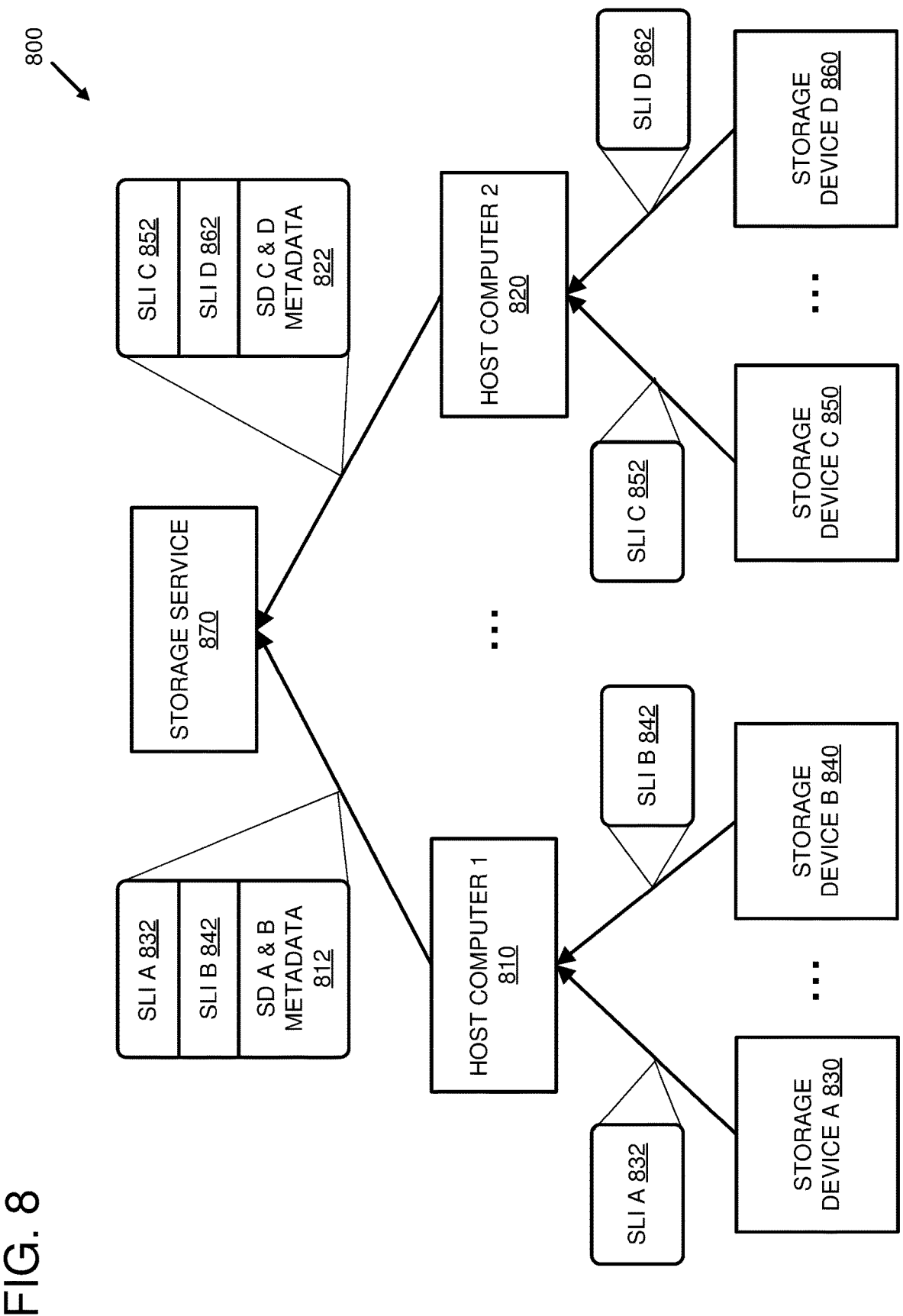
FIG. 8 is a system diagram showing an example system comprising a storage service configured to receive SLIs and metadata for storage devices from multiple host computers.

FIG. 8 is a diagram showing an example system 800 comprising a storage service 870 configured to receive SLIs (e.g., SLI A 832-SLI D 862) and metadata (e.g. storage device metadata 812-822) for multiple storage devices (e.g., storage device A 830-storage device D 860) from multiple host computers (e.g., host computer 1 810-host computer 2 820).

Example system 800 comprises multiple host computers 810-820 connected to multiple storage devices 830-860. For example, the host computer 1 810 is connected to the storage devices A 830-B 840 and the host computer 2 820 is connected to the storage devices C 850-D 860. The host computers 810-820 are configured to receive SLIs 832-863 from the storage devices 830-860 connected to the host computers 810-820. For example, the host computer 1 is configured to receive the SLI A 832 from the storage device A 830 and the SLI B 842 from the storage device B 840; the host computer 2 820 is configured to receive the SLI C 852 from the storage device C 850 and the SLI D 862 from the storage device D 860, etc.

The host computers 810-820 are also configured to track storage device metadata 812-822 for the connected storage devices 830-860. The host computer 1 810 tracks the storage metadata 812 for the storage devices A 830-B 840, the host computer 2 820 tracks the storage metadata 822 for the storage devices C 850-D 860, etc. Metadata for a storage device comprises information describing the data stored on the storage device. A host computer connected to a storage device can track the metadata for a storage computer, for example, by tracking data access operations performed on the storage device and creating one or more records that indicate which data is stored on the storage device.

The multiple host computers 810-820 are configured to transmit the SLIs 832-862 and the storage device metadata 812-822 to the storage service 870. The storage service 870 can be a service running on one of the host computers 810-820 or a separate server computer. The host computer 1 810 transmits the SLIs 832-842 and the metadata 812 for the storage devices A 830-B 840 to the storage service 870. Similarly, the host computer 2 820 transmits the SLIs 852-862 and the metadata 822 for the storage devices C 850-D 860 to the storage service 870. Although shown as a single message in FIG. 8, the SLIs 832-842, and the storage device metadata 812 can be sent in separate transmissions from the host computer 1 810 to the storage service 870. Similarly, the SLIs 852-862, and the storage device metadata 822 can be sent in separate transmissions from the host computer 2 820 to the storage service 870.

The storage service 870 can be configured to receive data access requests (not shown) and identify one or more of the storage devices 830-860 to use to process the received data access request. The identifying can be based on the SLIs 832-862 and the storage device metadata 812-822. The storage service 870 can be configured to use the SLIs 832-862 to identify one or more of the storage devices 830-860 that are in need of maintenance and to schedule the identified one or more storage devices for maintenance.

Figure 9:
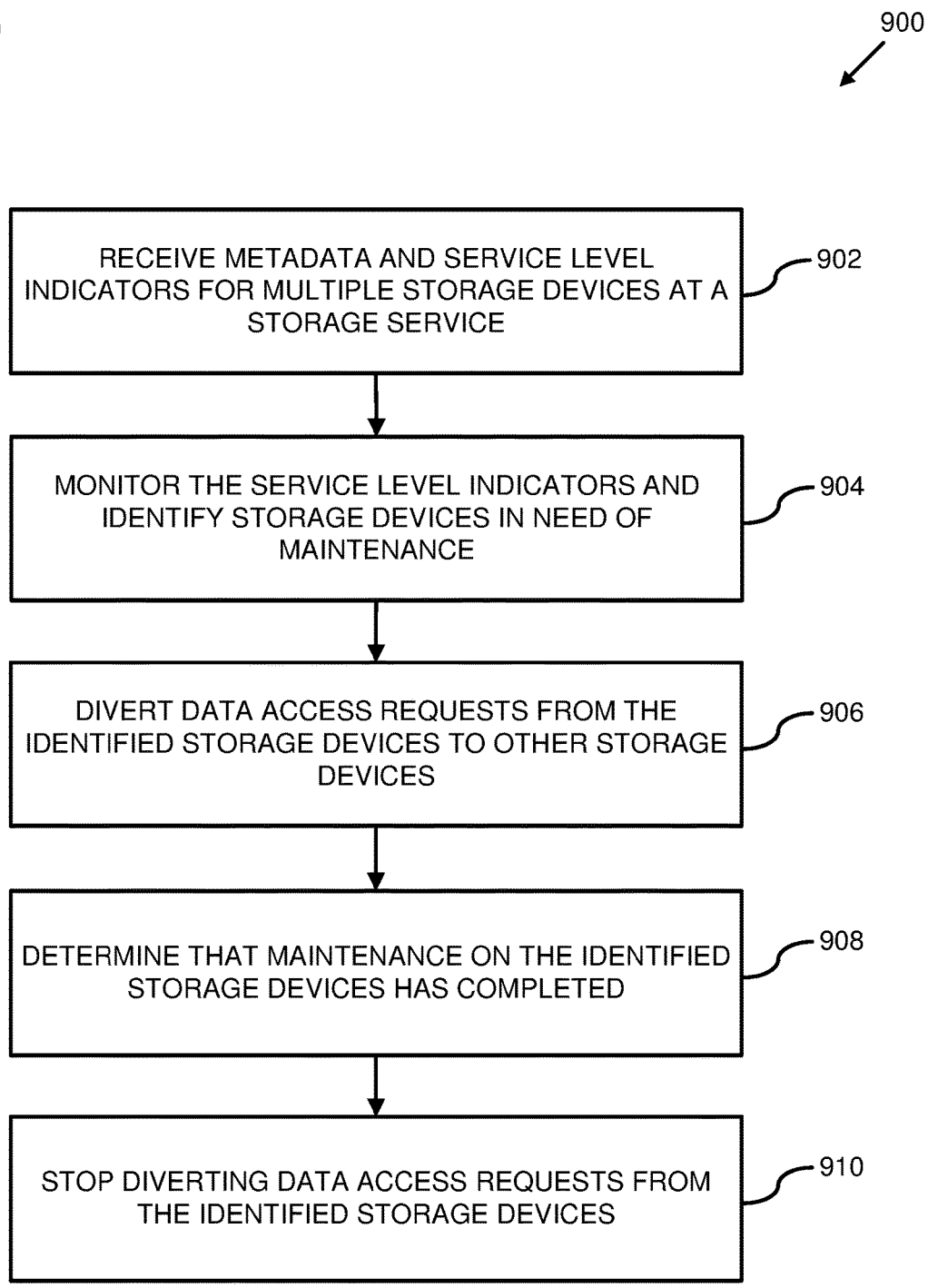
FIG. 9 is a flowchart of an example method for detecting storage devices in need of maintenance using SLIs and diverting data access requests from the detected storage devices until maintenance has completed.

FIG. 9 is a flowchart of an example method 900 for using a storage service to identify storage devices in need of maintenance using SLIs and diverting data access requests from the identified storage devices until maintenance has completed.

At 902, metadata and SLIs for multiple storage devices are received at a storage service. The storage service can be, for example, storage service 870 in example system 800. The metadata and SLIs can be received from one or more host computers connected to the multiple storage devices and the storage service. The one or more host computers can be, for example, one or more of the host computers 810-820 in example system 800. The multiple storage devices can be, for example, the storage devices 830-860 in example system 800. The metadata can identify which data are stored on which of the multiple storage devices. In at least some embodiments, data can be stored redundantly on the multiple storage devices. In different or further embodiments, the data stored on the multiple storage devices can be organized into multiple objects. Multiple copies of a given object can be stored on at least some of the multiple storage devices. Alternatively or additionally, a given object can be divided into multiple pieces, or shards, and multiple copies of the multiple pieces of the object can be stored on at least some of the multiple storage devices. In such embodiments, the metadata for the multiple storage devices can identify which objects (or which pieces of which objects) are stored on the various storage devices.

At 904, the storage service monitors the SLIs for the multiple storage devices and identifies storage devices, of the multiple storage devices, in need of maintenance. A storage device can be identified as in need of maintenance, for example, when its SLI has a certain value or is greater than or equal to a specified threshold.

At 906, the storage service diverts data access requests from the identified storage devices to other storage devices. The storage service can schedule the identified storage devices for maintenance and divert data access requests to other storage devices while the storage devices continue to be scheduled for maintenance. For example, a storage device can be marked as being scheduled for maintenance until maintenance on the storage device is completed. Alternatively, the storage device can use different indicators to identify when a storage device is scheduled for maintenance and when the storage device is undergoing maintenance.

The diverting data access requests can comprise receiving a request for data stored on an identified storage device, using the storage device metadata to identify another storage device, of the multiple storage devices, that also stores a copy of the requested data, and processing the request using the other storage device.

In at least some embodiments, the storage service can use one or more prioritization data structures, based on the SLIs for the storage devices, to divert the data access requests. The storage service can use the storage device metadata to determine which of the storage devices are storing which pieces of data. For a given piece of data, the storage service can use a prioritization data structure to rank the storage devices storing copies of the given piece of data using their SLIs. For example, the pieces of data can be associated with identifiers that can be used to uniquely identify the pieces of data. A request for a given piece of data can identify the requested data using its identifier. The storage service can locate the prioritization data structure for the given piece of data using the identifier, and select one of the storage devices storing a copy of the given piece of data based on the rankings of the storage devices in the prioritization data structure. In at least some embodiments, as new SLIs and/or metadata for the storage devices are received, the one or more prioritization data structures can be updated.

At 908, the storage service determines that the maintenance on one or more of the identified storage devices has completed. The storage service can make this determination, for example, by continuing to monitor the SLIs for the storage devices and determining, based on the SLIs, that one or more of the identified storage devices are no longer in need of maintenance. In different or further embodiments, the determination can be based on maintenance progress indicators received from the storage devices. The storage service can, alternatively, make the determination based on modes of the identified storage devices. For example, in at least some embodiments, the storage service can receive notifications when a given storage device enters and exits a maintenance mode. The storage service can determine that maintenance on the given storage device has completed when it receives a notification that the storage device has exited the maintenance mode.

At 910, the storage device stops diverting the access requests from the identified storage devices after maintenance on the identified storage devices has completed. The storage service can stop the diverting on a per-storage device basis and/or stop the diverting for multiple of the identified storage devices after maintenance has completed on the multiple of the identified storage devices. The stopping the diverting for a storage device can comprise unmarking the storage device as scheduled for service, updating one or more prioritization data structures using a new SLI for the storage device, and/or categorizing the storage device as not in need of service based on the new SLI for the storage device.

Figure 10:
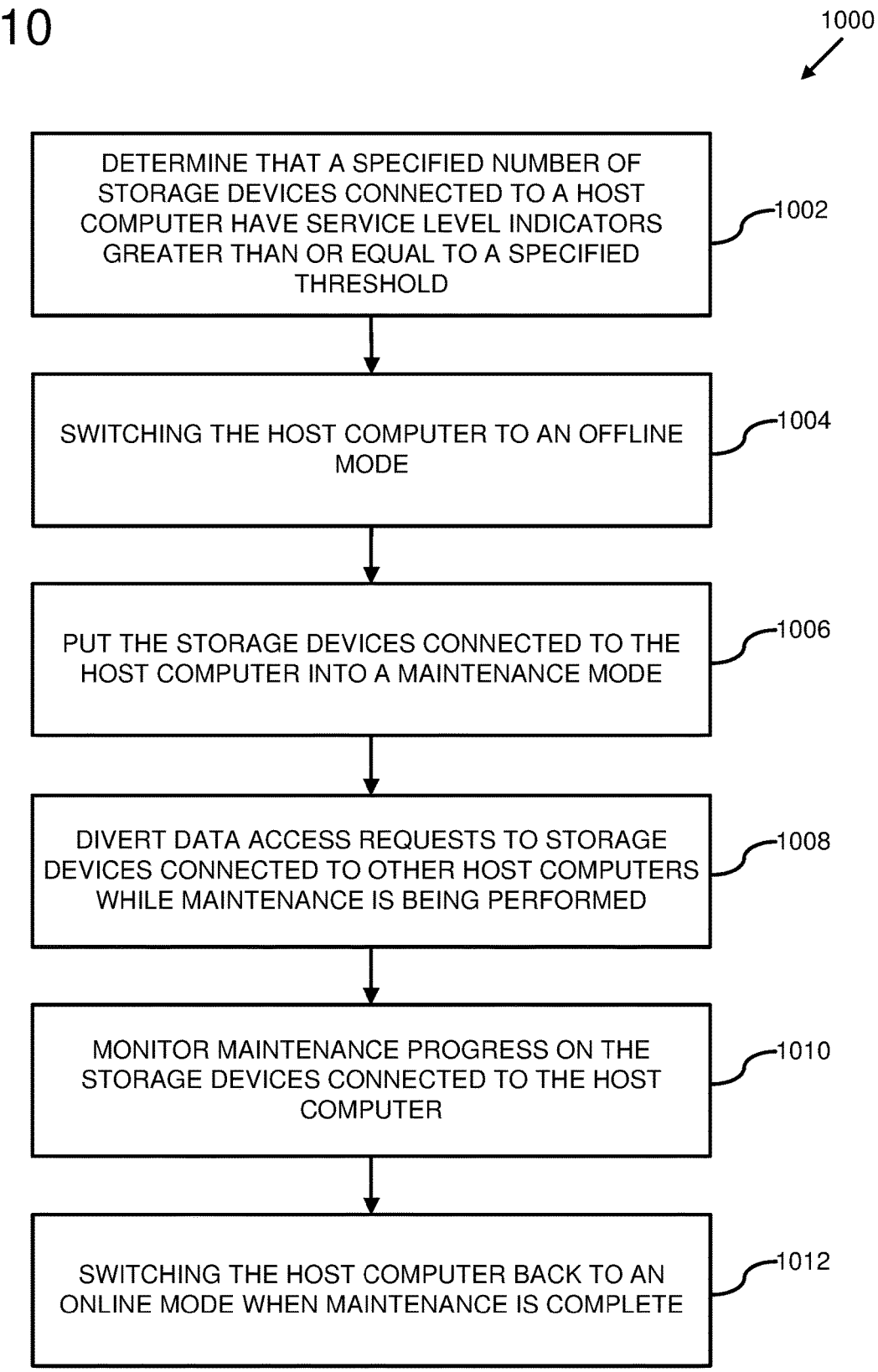
FIG. 10 is a flowchart of an example method for performing maintenance on storage devices by switching a host computer connected to the storage devices to an offline mode when a specified number of the storage devices have SLIs indicating that they are in need of maintenance.

FIG. 10 is a flowchart of an example method 1000 for performing maintenance on storage devices by switching a host computer connected to the storage devices to an offline mode when a specified number of the storage devices have SLIs indicating that they are in need of maintenance. Any of the example systems described herein can be used to perform the example method 1000.

At 1002, it is determined that a specified number of storage devices connected to a host computer have SLIs greater than or equal to a specified threshold. The determination can be made, for example, by a storage service connected to the host computer. The specified number of storage devices can be a particular number, a specified percentage of the storage devices connected to the host computer, etc. The determining can comprise collecting the SLIs for the storage devices, comparing the SLIs to the specified threshold, and determining that a number of the storage devices at least equal to the specified number have SLIs that are greater than or equal to the specified threshold.

At 1004, the host computer is switched to an offline mode. Switching the host computer to an offline mode can comprise removing the host computer from a pool of host computers that are available to receive data access requests. The pool of available host computers can be maintained, for example by the storage service. Additionally or alternatively, switching the host computer to an offline mode can comprise removing the storage devices connected to the host computer from one or more pools of available storage devices. In at least some embodiments, the storage service maintains one or more prioritization data structures used for prioritizing access requests for particular pieces of data based on SLIs for the storage devices. In such an embodiment, removing the storage devices from the one or more pools of available storage devices can comprise updating the one or more prioritization data structures to remove records for the storage devices connected to the host computer.

At 1006, the storage devices connected to the host computer are put into a maintenance mode. In at least some embodiments, putting the storage devices into a maintenance mode comprises scheduling the storage devices for maintenance. By switching the host computer to an offline mode at 1004, data access requests will no longer be transmitted to the storage devices which, in at least some embodiments, can trigger an idle maintenance mode of the storage devices. In at least some cases, marking the storage devices as scheduled for maintenance can indicate that the storage devices are no longer being used to process data access requests and should be monitored for maintenance progress. In different or further embodiments, putting the storage devices into a maintenance mode comprises transmitting commands to the storage devices to enter a storage device maintenance mode.

At 1008, data access requests are diverted to storage devices connected to other host computers while maintenance is being performed on the storage devices connected to the offline host computer. The diverting can comprise detecting that the host computer is in the offline mode, identifying one or more other storage devices that contain the requested data and that are connected to one or more other host computers that are in an online mode, and transmitting data access requests for the data to the one or more other storage devices via the one or more other online host computers.

At 1010, the progress of the maintenance on the storage devices connected to the offline host computer is monitored. The monitoring can comprise retrieving SLIs for the storage devices and using the SLIs to determine how close the storage devices are to no longer requiring maintenance. In at least some embodiments where the storage devices enter storage device maintenance modes, the storage devices can signal that they are no longer in the storage device maintenance modes. In such an embodiment, the signals can be detected and used as the basis of a determination that maintenance on the storage devices is complete. In different or further embodiments, the storage devices can provide maintenance progress updates that can be monitored and used as the basis of a determination that maintenance on the storage devices is ongoing or is complete.

At 1012, the host computer is switched back to an online mode when the maintenance on the storage devices is complete. Once it is determined that maintenance on the connected storage devices has completed, the diverting of data access requests can be terminated. Switching the host computer back to the online mode can comprise adding the host computer to the pool of available host computers, adding the storage devices to the pool of available storage devices, and/or adding the storage devices to the one or more prioritization data structures. In at least some embodiments where the storage devices are added to the pool of available storage devices, new SLIs can be retrieved for the storage devices and used to rank the storage devices in the prioritization data structures. In embodiments where the host computer was marked as being scheduled for maintenance, the mark can be removed. After the host computer is switched back to the online mode, data access requests can be transmitted to the storage devices connected to the host computer.

Figure 11:
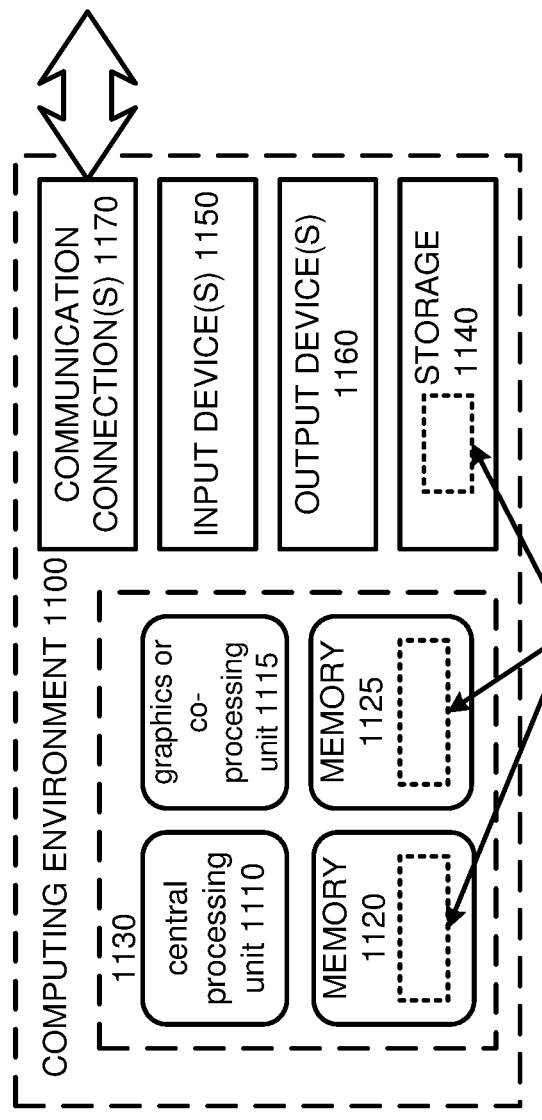
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

In at least some embodiments, the computing environment 1100 can be used as an example host computer as described herein. In different or further embodiments, the computing environment 1100 can be used as a server computer comprising a storage service as described herein.

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein. In at least some embodiments, storage 1140 comprises one or more of the example storage devices as described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. *The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for retrieving data using a host computer connected to multiple storage devices, the method comprising:

receiving a request for data at the host computer;

determining that the requested data is stored redundantly on a first storage device connected to the host computer and a second storage device connected to the host computer;

retrieving, by the host computer, a first service level indicator (SLI) from the first storage device and a second SLI from the second storage device, wherein the first and second SLIs indicate levels of need for service to be performed on the first and second storage devices, respectively;

determining, using the first and second SLIs, that the second storage device has a greater need for service than the first storage device; and as a result of the determining, retrieving the requested data from the first storage device instead of the second storage device.

2. The method of claim 1, further comprising:

determining that the second SLI is above a specified threshold;

performing service tasks on the second storage device; and fulfilling data access requests for data stored on both the first and second storage devices using the first storage device while the service tasks are performed on the second storage device.

3. The method of claim 2, further comprising:

switching the second storage device to an offline mode before the performing of the service tasks; and switching the second storage device back to an online mode after the performing of the service tasks.

4. The method of claim 2, wherein:
the first storage device and the second storage device are connected to different host computers; and
the method further comprises:
  switching the host computer connected to the second storage device to an offline mode before the performing of the service tasks; and
  switching the host computer connected to the second storage device back to an online mode after the performing of the service tasks.

5. The method of claim 2, wherein the specified threshold is selected from a range of available thresholds based on quality of service requirements for the data stored redundantly on the first and second storage devices.

6. A method, comprising: retrieving service level indicators (SLIs) for multiple storage devices, wherein the multiple storage devices are storing separate copies of data, wherein the SLIs for the multiple storage devices indicate levels of need for service to be performed on the multiple storage devices; and prioritizing requests to retrieve the data from the multiple storage devices based on the SLIs for the multiple storage devices.

7. The method of claim 6, wherein an SLI comprises a percentage value that indicates how close a storage device is to requiring background maintenance.

8. The method of claim 6, further comprising:
monitoring a response rate of one of the multiple storage devices;
determining that the response rate is below a specified device failure threshold;
retrieving an SLI for the storage device; and
if the SLI indicates that the storage device is performing background maintenance, deprioritizing access requests to the storage device;
otherwise, marking the storage device as a failed device.

9. The method of claim 6, further comprising:
detecting that an SLI for a storage device, of the multiple storage devices, is equal to or greater than a specified threshold; and
scheduling the storage device for background maintenance.

10. The method of claim 9, further comprising:
placing the storage device in a maintenance mode to perform the background maintenance on the storage device; and
determining that the background maintenance on the storage device is complete based on a change in the SLI for the device.

11. The method of claim 10, wherein placing the storage device in a maintenance mode comprises:
sending data access requests to other storage devices, of the multiple storage devices, instead of the storage device in order to trigger an idle maintenance mode of the storage device.

12. The method of claim 10, wherein placing the storage device in a maintenance mode comprises:
transmitting a command to the storage device to enter the maintenance mode.

13. The method of claim 10, further comprising:
retrieving a diagnostic code from the storage device; and
determining, using the diagnostic code, that the storage device has experienced a failure.

14. The method of claim 6, wherein an SLI comprises an estimated amount of time that it would take for the storage device to perform pending maintenance operations.

15. A system, comprising:
a storage device, comprising a storage medium, the storage device being configured to generate a service level indicator (SLI) that indicates how close the storage medium is to requiring maintenance; and
a host computer connected to the storage device and configured to:
  retrieve the SLI from the storage device, and
  determine whether to perform a data access operation to retrieve the data from the storage device based on the SLI.

16. The system of claim 15, wherein:
the storage device is a first storage device and the SLI is a first SLI;
the system further comprises:
  a second storage device, comprising a second storage medium and configured to generate a second SLI that indicates how close the second storage medium is to requiring maintenance; and
the host computer is connected to the second storage device and is further configured to:
  store data redundantly on the first and second storage devices,
  retrieve the second SLI from the second storage device, and
  perform the data access operation on the second storage device if the first SLI and the second SLI indicate that the first storage device is closer to requiring maintenance than the second storage device.

17. The system of claim 15, further comprising:
multiple host computers connected to multiple storage devices, wherein the host computer is one of the multiple host computers; and
a server computer comprising a storage service configured to:
  receive metadata from the multiple host computers describing the data stored on the multiple storage devices, and
  receive SLIs for the multiple storage devices from the multiple host computers.

18. The system of claim 17, wherein the storage service is further configured to:
monitor the SLIs for the multiple storage devices received from the multiple host computers;
identify storage devices in need of maintenance using the SLIs; and
schedule the identified storage devices for maintenance.

19. The system of claim 18, wherein the storage service is further configured to:
divert data access requests from the identified storage devices to other storage devices, of the multiple storage devices, while the identified storage devices are scheduled for maintenance.

20. The system of claim 19, wherein the diverting data access requests comprises:
receiving a request for data stored on one of the identified storage devices;
using the metadata received from the multiple host computers to identify another one of the multiple storage devices, storing a copy of the requested data; and
processing the data access request using the another one of the storage devices identified using the metadata.

21. The system of claim 18, wherein scheduling the identified storage devices comprises:
ranking the identified storage devices based on the SLIs of the identified storage devices;

selecting a specified number of the identified storage devices based on the ranking; and switching the selected storage devices to a service mode.

22. The system of claim 21, wherein the specified number of selected storage devices is based on one or more data redundancy criteria.

23. The system of claim 17, wherein the storage service is further configured to:
- determine that a specified percentage of storage devices connected to a particular host computer, of the multiple host computers, have SLIs greater than or equal to a specified threshold;
- switch the particular host computer to an offline mode; and
- schedule maintenance for the storage devices connected to the particular host computer with SLIs greater than or equal to the specified percentage.

* * * * *